(No Model.)
L. A. AGNEY.
BREAD RAISING CABINET.
No. 450,604. Patented Apr. 21, 1891.
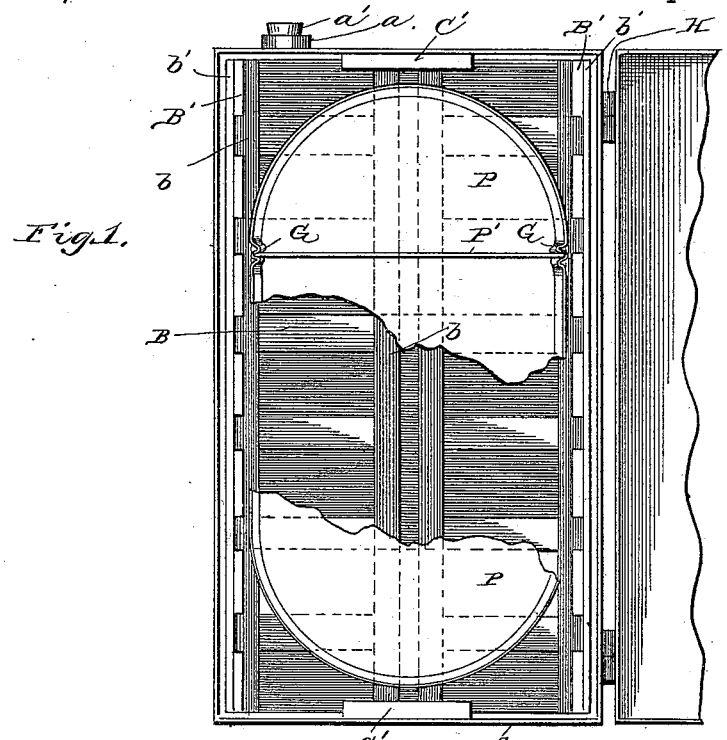
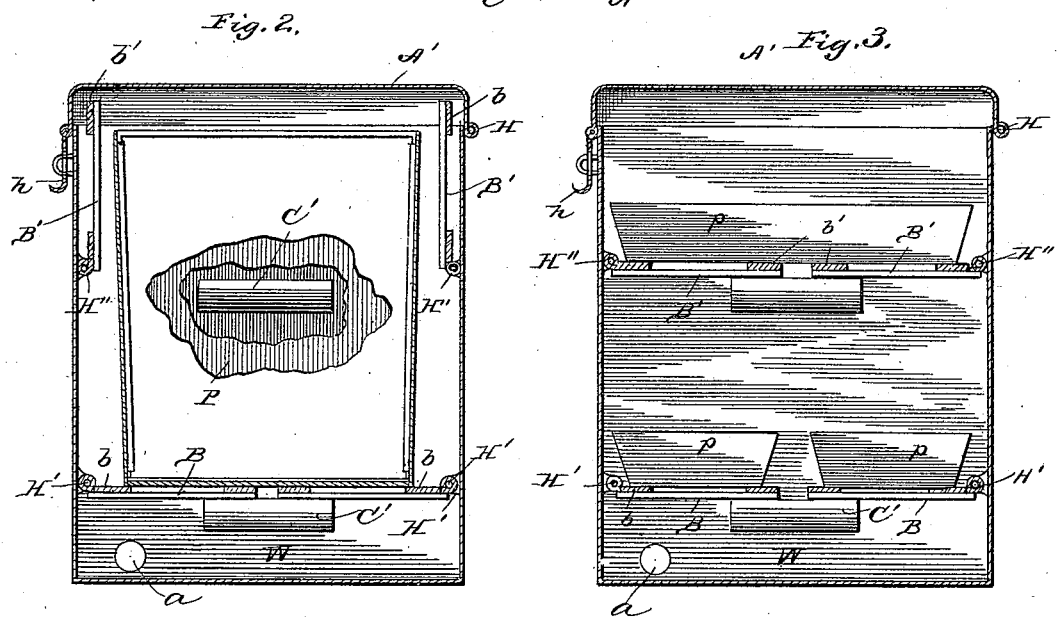
Witnesses:
Harry S. Rohrer
J. M. Fowler Jr.
Inventor
Luella A. Agney
By Miles & Greene,
Attorneys.

UNITED STATES PATENT OFFICE.

LUELLA A. AGNEY, OF FREEPORT, ILLINOIS.

BREAD-RAISING CABINET.

SPECIFICATION forming part of Letters Patent No. 450,604, dated April 21, 1891.

Application filed September 26, 1890. Serial No. 366,243. (No model.)

*To all whom it may concern:*

Be it known that I, LUELLA A. AGNEY, a resident of Freeport, in the county of Stephenson and State of Illinois, have invented certain new and useful Improvements in Bread-Raising Cabinets; and I do hereby declare the following to be a full, clear, and exact description of the invention, such as will enable others skilled in the art to which it pertains to make and use the same.

My invention relates to improvements in bread-raising cabinets for household use, and is fully described and explained in this specification and shown in the accompanying drawings, in which—

Figure 1 is a top plan of a cabinet embodying my improvements, the cover of the cabinet being opened or thrown back; and Figs. 2 and 3 are transverse sections of the pan of the cabinet, illustrating its use.

In the views, A is a preferably rectangular box provided with a cover secured to the box by hinges H, and having a hasp $h$ of ordinary construction for fastening the cover when closed. Within the box are two pairs of shelves, one near the bottom and the other midway between the lower and the top of the box, the lower pair being made up of transverse slats B and longitudinal bars $b$, and the upper pair being made up of similar transverse slats and longitudinal bars B' $b'$. The two shelves of the lower pair are secured to the two sides of the box by hinges H', and those of the upper pair are similarly held in place by hinges H''. When in their horizontal position, the inner edges of the shelves are supported by cleats C' C', fastened to the end walls of the box, and each of the shelves may be swung upward to a vertical position, the upper pair of shelves being shown as so raised in Fig. 2. Below the lower pair of shelves and near the bottom of the box is a drainage-tube $a$, which may be closed by a plug $a'$ or in any other desired manner, the object of this drainage-tube being to provide for a convenient discharge from the box of water of any desired temperature which may be placed in it for the purpose of accelerating or retarding the raising of bread-dough in its various stages.

In the making of bread it is customary to first mix flour and water with yeast or other fermenting material in a comparatively thin or fluid mass and allow this to ferment until it has reached a certain stage of lightness, when more flour is added to form a stiff dough. This dough is molded into loaves and subjected to a further fermentation before baking. During the first fermentation it is most convenient to have the entire mass together in a single large pan or other vessel, whereas after the dough is molded into loaves for the second fermentation it is ordinarily and most conveniently placed in the smaller pans in which it is to be baked.

One principal object of the construction of my cabinet is to provide for the reception and support of the vessels required for the two different stages of fermentation above referred to. For the first fermentation I use a large and deep pan P, preferably of such height as to reach very nearly to the top of the box or cabinet when resting upon the slats B B of the lower pair of shelves, the upper pair of shelves being raised, as illustrated in Fig. 2, and being wholly out of the way. For the second fermentation I use a series of ordinary bread-baking tins $p$ of such height as to be readily received between the upper and lower pairs of shelves and between the upper shelves and the top of the box, as illustrated in Fig. 3. I thus provide fully for the convenient commencement and completion of the fermentation of the dough in both its stages, this fermentation being assisted or retarded at every stage by the use of water, either heated or cold, placed in the bottom of the box.

I have found in practice that it is frequently convenient to raise bread material of two kinds at the same time, and, as it is much more convenient and economical of space to have a single large bread-raising pan occupying practically the entire space in the cabinet than to have two of smaller size, I have found it an advantage to provide the pan with a movable partition P', as illustrated in Figs. 1 and 2, the pan being thus adapted for use with material of two kinds. As shown, this partition P' may be readily inserted or removed, and when in use is held in place by guides G G, permanently fastened to the walls of the pan. These guides, if made in the form shown, offer but very slight obstacles to the perfect cleaning of the pan and afford but little lodgment for dough or other material placed therein.

The use of the divided shelves hinged to the opposite walls of the box or cabinet is a great advantage as compared with the use of single shelves placed one above the other and each extending completely across the box, since by the use of the construction illustrated each shelf when raised is completely out of the way and requires no extra space.

An inspection of the drawings shows that each of the lower shelves may be swung upward without interfering with the shelves above, and each of the upper shelves may be raised without interfering with the other. It is evident that if each shelf were twice as wide, or wide enough to extend completely across the box, the proportion of height of box would necessarily be much greater than it is and economy of space would be thereby sacrificed.

Having now described and explained my invention, what I claim as new, and desire to secure by Letters Patent, is—

1. In a device of the class described, the combination, with a suitable box, of shelves hinged to the walls of the box, and supports fastened to the walls of the box and adapted to sustain said shelves when horizontal, substantially as and for the purpose set forth.

2. In a device of the class described, the combination, with a suitable box, of a pair of shelves hinged to the opposite walls of the box near the bottom thereof, a second pair of shelves hinged to the walls of the box between said lower pair and the top of the box, and supports fastened to the walls of the box and adapted to sustain said shelves, respectively, when horizontal, substantially as and for the purpose set forth.

3. The combination, with a box A, having the cover A' and the outlet a, of the hinged shelves B B B' B' and supports C C', the shelves B B being adapted to be raised without interfering with the shelves B' B', and the shelves B' B' being free to be raised without interfering with the cover of the box when closed, substantially as and for the purpose set forth.

In testimony whereof I have signed this specification in the presence of two subscribing witnesses.

LUELLA A. AGNEY.

Witnesses:
R. H. WILES,
J. A. CRAIN.